Jan. 10, 1967  J. A. RIDGWAY, JR  3,297,431
CELLARIZED METAL AND METHOD OF PRODUCING SAME
Filed June 2, 1965  4 Sheets-Sheet 1

INVENTOR.
JOHN A. RIDGWAY, JR.

Jan. 10, 1967  J. A. RIDGWAY, JR  3,297,431
CELLARIZED METAL AND METHOD OF PRODUCING SAME
Filed June 2, 1965  4 Sheets-Sheet 3

INVENTOR.
John A. Ridgway, Jr.
BY
ATTORNEY

MANUFACTURE OF FACED CELLULATED PANELS

United States Patent Office 3,297,431
Patented Jan. 10, 1967

3,297,431
CELLARIZED METAL AND METHOD OF
PRODUCING SAME
John A. Ridgway, Jr., La Porte, Ind., assignor to Standard Oil Company, Chicago, Ill., a corporation of Indiana
Filed June 2, 1965, Ser. No. 460,754
7 Claims. (Cl. 75—20)

This invention relates to metal compositions, and more particularly, relates to compositions having unique physical properties that are particularly useful in the manufacture of metal matrices confining discrete gas-filled cells. The invention further relates to articles of foam metal produced from said compositions and to methods of making the same. The invention additionally relates to certain uses of such compositions independent of the foam-like matrices. The invention herein described is a continuation-in-part of copending application, Serial No. 277,291, filed May 1, 1963, now abandoned.

The performance of metals in structures involving bending or, especially, buckling-type failure requires that the structure have a large cross-sectional area per unit of weight. Conventional structures, such as beams and panels assembled around a honeycomb core, are capable of providing efficient performance but at a relatively high fabricating cost. Efficient performance at reduced cost may, in theory, be realized by using cellularized metals, which are solid foams.

Unfortunately, cellular metals are prepared only with great difficulty, and the products frequently have nonuniform quality. Techniques of cellularizing metals said to be free of these limitations are limited to the manufacture of relatively small components. The reasons underlying these several limitations are that cellularized metals are usually prepared by incorporating into the molten metal a material which evolves gas on heating, thereafter heating the melt to gas evolution temperature, and rapidly cooling the product to freeze the porous structure. Gas evolving compounds are limited to those which release gas at temperatures just above the melting point of the metal so that on cooling the metal freezes rapidly to entrap gas.

Insofar as is known, a foam cannot be produced at present without the use of excessive quantities of gas forming agents. This leads to the production of metal foams having unpredictably large void sizes and ruptured cell walls between the voids.

The requirements of homogenous mixing, uniform and controlled gas evolution, and rapid cooling imposed on prior art production of metal foams limit quality of product and, by reason of the insulating characteristics imparted by the cellular structure, limit cellularization to the manufacture of relatively thin sections.

Accordingly, it is an object of this invention to provide a composition suitable for metal foam production which enables greater flexibility to be attained in control of cell structure of metal foams using conventional production techniques.

It is a further object of this invention to provide a composition suitable for production of metal foams from which the aforesaid foams can be produced without the burdensome control required in the prior art and thereby having significant advantages over the prior art.

It is a still further object of this invention to provide a reliable foam metal product containing a uniform dispersion of predominantly contiguous and gas-filled cells adaptable to widespread structural use in such diverse areas as aircraft, missiles, and building and construction.

It is another object of this invention to provide a composition for production of metal foams wherein a stable foam is obtained by using only a minimum amount of gasifying agent consistent with the production of predominantly contiguous and uniformly dispersed compact gas-filled cells.

It is still another object of this invention invention to provide simple and economical novel methods of producing reliable foam metal bodies and improvements in methods known to the art.

The invention, in its various aspects, will be described in more detail, and various other objects and advantages and additional features thereof will become more apparent in the ensuing specification, which is to be read in conjunction with the attached drawings wherein.

Figure 4:
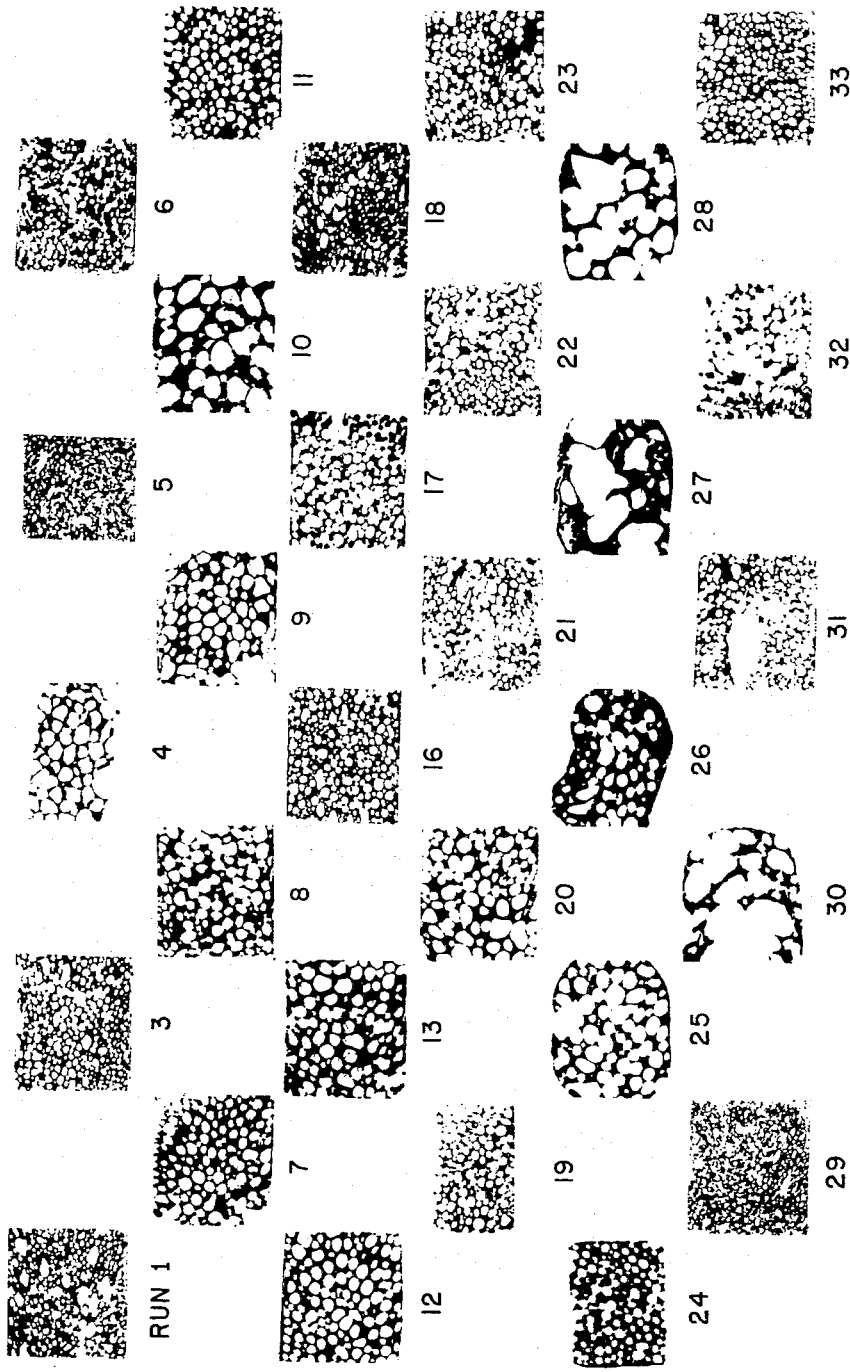

FIG. 4 displays natural size contact prints of foamed metals prepared according to the invention, the prints having been made by sectioning samples prepared by the specific techniques described below and corresponding to the run designation of the respective prints.

Figure 5:
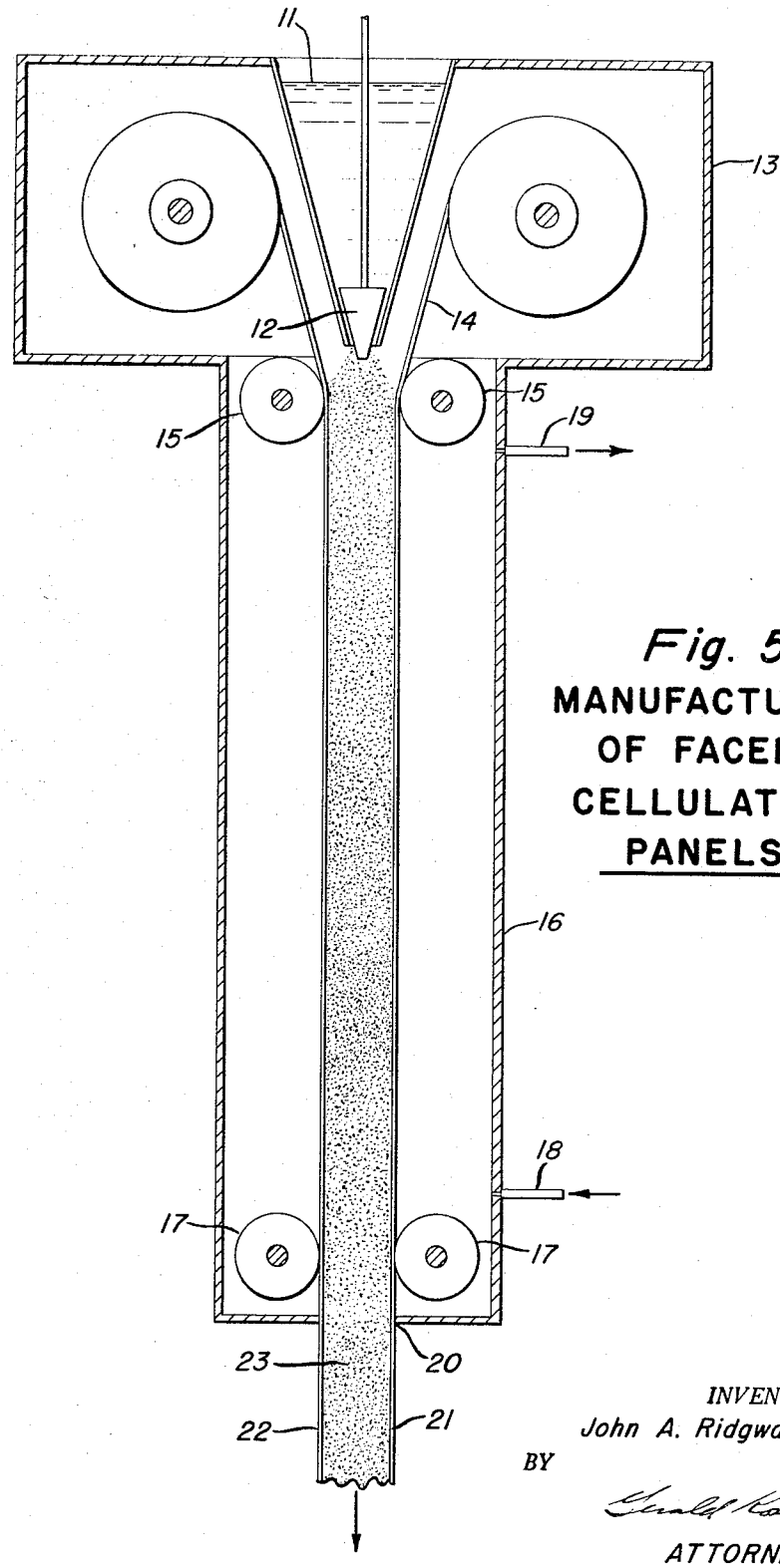

FIG. 5 shows schematically an apparatus for producing a sandwich of cellularized metal bonded to facing sheets of solid metal.

The invention herein described includes within its scope the discovery that the cellular structure of molten metal foams may be stabilized, and hence maintained and thus preserved upon cooling, by incorporating into the metal a minor proportion by weight of an intimately dispersed, finely divided, inert powder which is wetted by the molten metal. The powder must be substantially non-melting and may or may not form an alloy with the base metal by diffusion or otherwise when the powder is in solid state. Optimum practice of the invention includes the use of two wettable powders, one of which forms a solid alloy with the metal while the other does not.

In using the invention described herein, a wettable stabilizer powder in a finely divided state is mixed with the material to be foamed. The powder must be (1) wetted by the matrix metal when the latter is in molten condition, (2) of proper size, preferably less than about 50 microns, (3) of adequate concentration, and (4) substantially non-decomposable and nonmelting at the operating temperatures. The powder used, its concentration and particle size are selected on the basis of the metal system to be foamed and on the void/metal concentration and void size that is desired. It is significant to note that the source of the cellulating gas is not of major importance in this invention. The use of a stabilizer permits a large number of possible cellulation processes. One process having particular advantage is that using a gas dissolved at a first pressure and then evolved at a second, lower, pressure. The first pressure may be super atmospheric or atmospheric while the second pressure may be atmospheric or less. This latter simple process of production of foam metal by reduction of pressure could not be carried out in the prior art where the network of matrix metal is not stabilized to confine gas-filled cells. As an example of the versatility of this invention, some of the wide variety of cellulating procedures that have been employed using the composition of this invention are illustrated in the table below:

| Metal System | Stabilizing Powder | Cellulating Source |
| --- | --- | --- |
| 95 Sn–5 Zn | 11 wt. percent of −325 mesh Fe. | Zirconium Hydride. |
| Silver Solder | 9.1 wt. percent of −325 mesh Fe. | Phosphorus Nitride. |
| Mg–9 Al–2 Zn–0.1 Mn | 12 wt. percent of −325 mesh B. | $H_2$ gas dissolved at 4 atm. and depressured. |
| Cast Iron | 10 wt. percent of 5 micron TiC. | $N_2$ gas formed by decomposition of $NH_3$ and evolved by depressuring. |

It should be understood that the above are merely illustrated by way of example and should not be taken as limiting the scope of the invention.

While the exact nature of the effect that operates to produce the improved foams obtained from the compositions of this invention is not definitely known, it is postulated that the observed stabilizing effect is due to an effect that for convenience is termed two-dimensional dilatancy. A brief discussion of this postulated theory will aid the proper selection of variables for foam systems.

Where very low concentrations of wettable nonmelting nondecomposable powders are intermixed with a bath of molten metal, the individual powder particles are free to move without constraint in the molten metal and their addition has little effect on the fluidity of the molten metal system. If the concentration is now increased a concentration will be reached at which the movement of the particles begins to be constrained by the physical interaction between particles. This constraint causes a stiffening of the mixture, a phenomenon commonly called dilatancy. Consider a mixture as described above of borderline concentration and its formation into a film analogous to the wall that would form between contiguous gas-filled cells of a foam body. Where the thickness of the film is of the same order of magnitude as the effective diameter of the solid particles, the bulk freedom of the particles to maneuver in three dimensions when moving with respect to one another will be reduced to two dimensions. The loss of this one dimension of freedom will cause physical interaction between particles with the resultant so-called two-dimensional dilatant stiffening of the film. It is believed that this stiffening of the film between contiguous gas bubbles during cellulation is the mechanism whereby wettable powders stabilize a foam structure.

Figure 1:
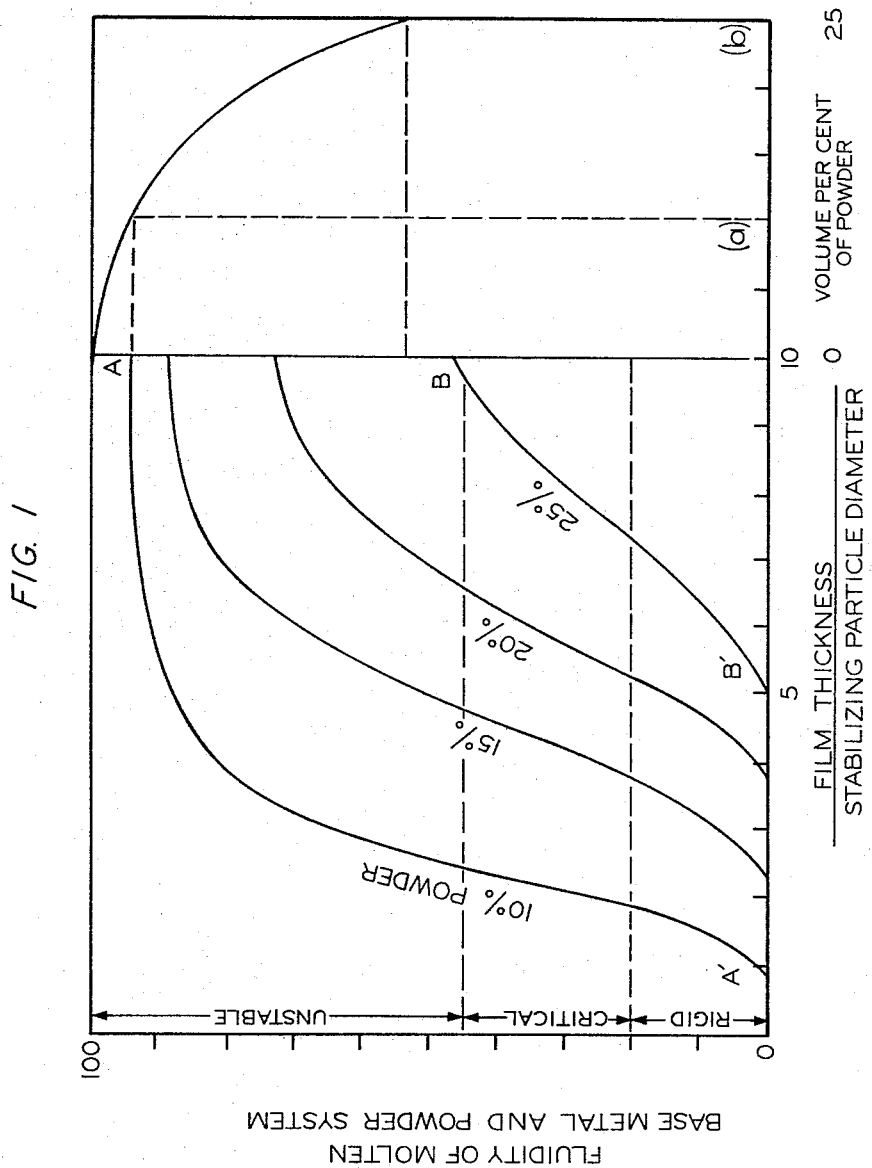
FIG. 1 illustrates graphically a method used to determine a specific composition of this invention that is to be used for the production of cellulated metal foams.

These considerations are illustrated qualitatively in FIG. 1. The curve on the right relates fluidity of the bulk mixture with its powder content. The curves on the left depict the change in fluidity of a given composition as it is being deformed into a thinner and thinner film. The meaning of the figure can be further clarified by an example: The composition denoted by (a) is shown to have a bulk fluidity of (A); if this composition is now formed into a film that is gradually extended so that its thickness becomes progressively less the fluidity changes illustrated by the curve A–A' will be observed. The rapid drop of fluidity reflects the development of two-dimensional dilatancy.

Considering the unusual behavior of low concentrations of powder particles, it is apparent that more is involved than mere physical interaction between the discrete particles and the molten metal. It is hypothesized that each particle is surrounded by a relatively immobile molten film of the matrix metal, and hence each particle has an effective size much greater than the size of the particle itself. This "effective" particle size appears to be controlled by the degree to which the molten metal wets the powder particle. A particularly favorable condition for wetting exists when the molten metal can diffuse into the surface layers of the stabilizer particle to form a solid alloy. It has been observed that lower concentrations of materials that form solid alloys (e.g., iron in a tin-zinc system) are required for a given stabilizing effect than when nonalloying powders are used. In order to disrupt what is, in effect, a fairly cohesive array of large "effective" particles, substantially greater compressive and shear stresses are required than would be the case if a liquid were involved. Stated differently, separation of the large effective particles is made difficult by the need for moving large particles of low mobility.

In either case, whether the powder is alloying or nonalloying, wettable powders form a stabilized two-dimensional film of a semisolid or pasty consistency, and it is this quasi rigidity which stabilizes the film, and hence stabilizes the cellular structure.

Stabilizing powders for the present invention are characterized by their ability to be wetted by the molten base metal. Other than the requirements that they be of proper size, in adequate concentration to achieve the desired result, and stable at operating temperatures, the specific nature of the powder is not critical. Powders may be metals or nonmetals, elements or compounds, and either added in the form of a powder or formed in situ by alloying of the added powder with the base metal or by decomposition of a powder precursor (e.g., finely divided magnesium nitride may be formed in magnesium metal by introducing ammonia). Powders may be added intermixed with a second powder which is miscible with, and may be the same as, the molten metal to be foamed or a component thereof. Wettability of the powder by the metal may be determined experimentally by observing whether the powder may be dispersed in the molten metal at the temperature proposed for cellulation. Wettability may also be ascertained by measuring the surface tension of the powder at the desired temperature and comparing it with the interfacial tension between the metal and the powder; if interfacial tension is the lesser, then wettability is obtained.

In designing a product according to this invention, the first consideration is the void fraction desired. This will determine the volume of cellulating gas required. Retention of 100 percent of the gas in the cellular structure is rarely achieved. Thus, in estimating the volume required, it is generally necessary to apply an efficiency factor. The factor will vary depending on the blowing and cellulating systems and the technique of cellulation so that it is difficult to generalize, but factors as low as 50 percent or less may be encountered.

The next design step is to estimate cell size. If small cells are desired, a system effective for gas bubble nucleation is chosen, e.g., a stabilizer system that is not completely wetted by the molten metal and contains powder particles with sharp angles. Materials can be added that will reduce the surface tension of the metal melt. For larger cells, less effective gas bubble nucleation is sought, e.g., a well wetted stabilizer with particles of rounded shape may be used. The relation between nucleation effectiveness (number of cells formed per unit volume), void fraction and cell size is shown in FIG. 2 as calculated for a system containing spherical cells.

Figure 2:
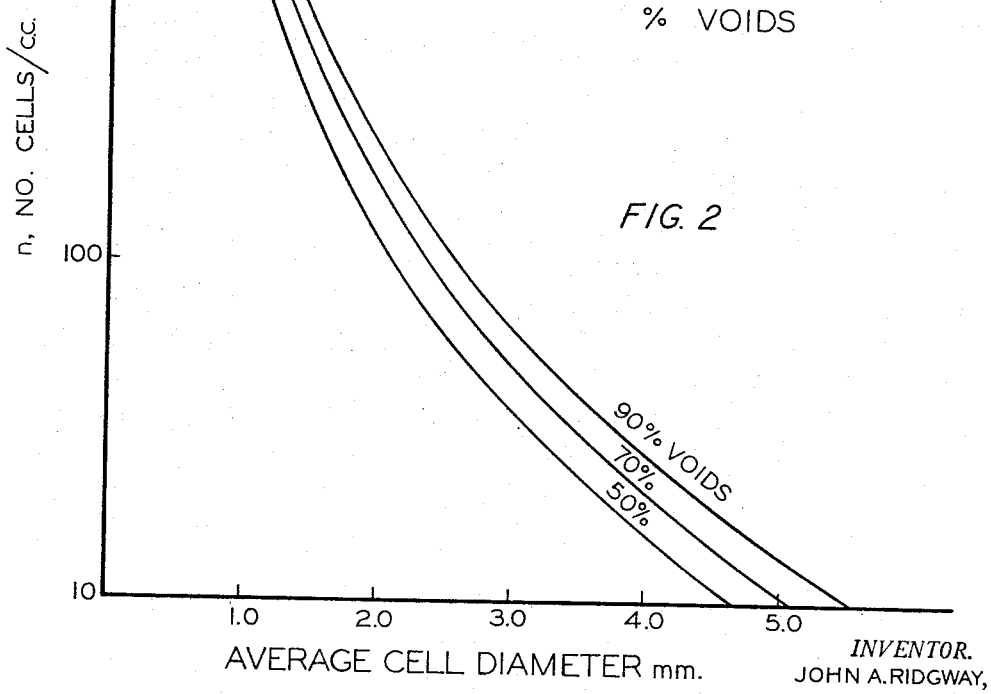
FIG. 2 illustrates the relation between gas bubble nucleation effectiveness and cell size in a metal froam structure.

Knowing void fraction and an estimated cell size from FIG. 2, it is then possible to calculate the average thickness of the intercellular metal film. This relation is developed in FIG. 3 for the case of spherical cells. Using the value of FIG. 3, the qualitative relation shown in FIG. 1 can be used in guiding the selection of the preferred formulation. This will become more apparent in ensuing discussion.

Particle size is obviously important. To be effective, the stabilizing particles must be small enough to immobilize the liquid between them, yet large enough that their movement will be restricted at the film thicknesses required for cell stabilization. The smaller the particle, the thinner the film must be before restriction of movement and two-dimensional dilatancy occurs. For foams having smaller void sizes and higher void fractions, it is necessary to use smaller stabilizer particles to stabilize the thinner films of these foams. Smaller particles of stabilizer powder may also be used when such powders are highly wettable such as those that form a surface alloy with the matrix metal. These particles are particularly active in immobilizing a sheath of matrix metal which increases their effective size. It has been discovered that powders passing through a 325-mesh screen (U.S. Sieve being 325-meshes per linear inch, corresponding to a sieve opening of 0.0017 in. or 0.043 mm.) are suitable, while particles substantially larger than 170-mesh (sieve opening of .0035 in. or 0.088 mm.) are not. When particles of the latter size are used, molten metal drains from between them thus allowing a film containing them to puncture and collapse. Adequate but not optional stabilization is accomplished with spherical particles of 5 micron diameter or less. It would, therefore, appear that there is no advantage in having powders with particle sizes larger than about 90 microns or significantly larger than about 50 microns or smaller than about 1 micron in average diameter.

Figure 3:
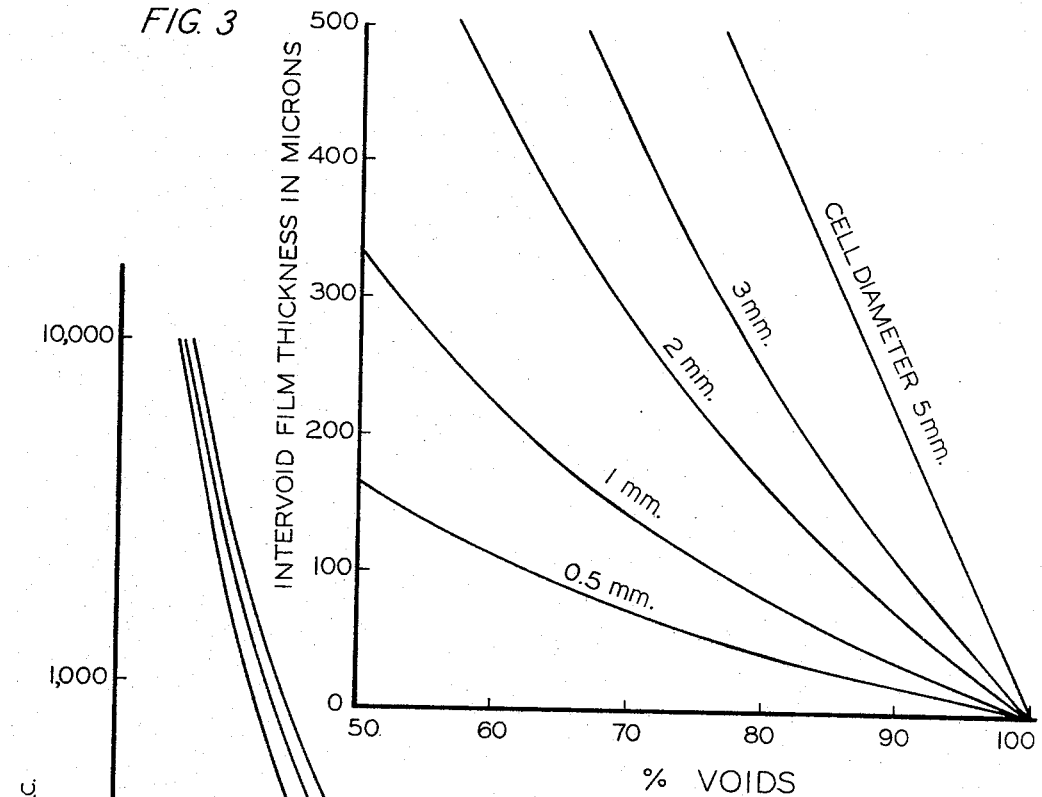
FIG. 3 illustrates factors controlling intervoid film thickness in a foam metal structure to be used in connection with FIG. 1 to determine a specific composition of this invention.

As a general rule, at constant particle weight concentration, particle sizes predominantly in the 20–50 micron range are useable at all void/metal ratios and all cell sizes are readily achieved. Stated differently, a particle size diameter equal to 0.2 to 0.5 the intervoid film thickness as estimated from FIG. 3 is suggested. Of course, as discussed above, smaller particles are more suitable at high void/metal ratios and/or small cell sizes. Conversely, at any constant particle size, low concentrations tend to be most suitable where there is a high void/metal ratio and/or small cell sizes, with higher concentration useable at lower ratios and/or larger cell dimenisons.

Having made the selection of wettable powder, approximate paritcle size, and cellulation gas volume, it becomes necessary to consider the effective quantity of stabilizer powder needed to accomplish the desired result. Certain considerations used in selecting particle size such as the nature of the base metal and powder (e.g., alloying or non-alloying), will again of course be influential. However, for a given particle size and particle characteristics, the quantity of powder used will depend first, on the intervoid film thickness of the desired product.

FIG. 1 provides a useful guide to select optimum particle size and concentration of stabilizer by routine experimentation. Three arbitrary degrees of fluidity are labeled on the left part of the vertical axis of FIG. 1. In the upper "unstable" region, the previously described dilatancy effect has not reached a point where film stability is achieved. In the middle "critical" region, stability is achieved but the film is still flexible and can be stretched and deformed without breaking. In the bottom "rigid" zone a high degree of dilatancy exists; the film is stable but somewhat brittle so that deformation will cause it to break. Further understanding of FIG. 1 is achieved by considering the individual curves A–A' and B–B'. A–A' represents the fluidity relations of a mixture of molten metal and stabilizer wherein the concentration of stabilizer is low and given by "$a$." Substantial thinning is necessary before the critical fluidity is achieved; subsequently only a small additional amount of reduction in thickness can be tolerated before the system enters the rigid zone. For satisfactory operation in such a system, it is necessary to employ rapid cellulation to get through the unstable region without excessive loss of gas together with very careful control of degree of cellulation to assure that intervoid wall thickness is reduced to the point that critical fluidity is achieved but not passed. If it is not achieved, a stable foam will not be obtained. If the film thickness corresponding to the rigid zone is developed and cellulating gas evolution continues, the cell walls are unable to stretch and will rupture to give a weak structure containing numerous broken cell walls. B–B' represents the fluidity of a mixture of molten metal and stabilizer wherein the concentration of stabilizer is high and given by "$b$." In this case, the critical fluidity is approached in the bulk mixture so that even a relatively thick film has some stability. The range of thicknesses characterized by the range of critical fluidity is large. Because of these characteristics, a system with high stabilizer loading is not as sensitive to the need for rapid cellulation or for careful control of degree of cellulation. On the other hand, high stabilizer loading can increase the cost of the product and in some cases can impart undesirable physical characteristics, such as a low degree of toughness. Generally, it is best to compromise on a middle range composition.

Considering these relations and knowing the film thickness of the desired product as estimated from FIG. 3, the exact particle size and concentration of a wettable stabilizing powder can be determined readily by routine experimentation. Using the rule of thumb noted previously or the approximate film thickness/stabilizing particle diameter as represented by the arbitrary scale of FIG. 1, a particle size can be selected for study. Several concentrations may be tried. Products with an uneven cell distribution indicate that critical fluidity has not been achieved and that more stabilizer is needed. Products with a weak broken structure indicate that the rigid region existed as a result of the use of too much stabilizer. If, in spite of careful adjustment, a satisfactory reproducible structure is not achieved, it must be concluded that too large a particle size is being employed for the preciseness of process control available. A brittle structure at optimum stabilizer level may indicate too small a particle size and hence too high a powder loading for best physical characteristics.

Finally, if the observed void fraction is substantially less than calculated it is probable that gas loss is occurring during the cellulating phase prior to development of critical fluidity in the intercellular films. Possible corrective steps are (1) increase the amount of cellulating gas to compensate for the low cellulating efficiency, (2) increase the rate at which gas evolution occurs so that criticality is achieved before the gas bubbles have an opportunity to escape from the melt, or (3) use a higher concentration of a smaller particle size stabilizer so that system characteristics such as those illustrated by curve B–B', FIG. 1 are approached.

By applying the technique illustrated generally by the graphical representation of FIG. 1, the effective quantity of stabilizer powder needed to accomplish a desired result is determined by routine experimentation. The successful application of this technique will become apparent from examples in the specification showing the wide range of concentrations of powders found to be operative in various metal systems. The specific examples furnished in the present specification may, of course, be relied upon for general guidance, but it is emphasized that powder concentration is strongly dependent on the nature of the specific system and on its application. For example, foaming magnesium casting alloy AZ92 with hydrogen gives optimal results with any of the following concentrations by weight of sub-325-mesh wettable powders; 7 percent silicon; 9 percent beryllium; 12 percent boron; 17 percent cobalt; and 47 percent molybdenum.

Once a metal-powder system has been found operative, routine experimentation readily establishes the powder concentrations that may be employed. For example, in the blowing of an alloy of 95 percent of tin and 5 percent of zinc with 0.4 percent of zirconium hydride, using sub-325-mesh iron powder, an iron/alloy weight ratio of 0 (no iron added) gives a solid metal; and iron/alloy ratio of 0.05 gives some cellulation but with less than optimal structure; an iron/alloy ratio of 0.10 gives excellent cellulation; a ratio of 0.15 gives good but not optimal cellulation, and an iron/alloy ratio of 0.20 gives cellulation with, however, some broken cells resulting from the pasty consistency of the magma. It can be seen that there is a broad workable range of concentrations between 0.05 and 0.15 powder/alloy weight ratios.

In carrying out the manufacture of foamed metals with the composition of this invention, a number of process techniques are available.

The stabilizer powder may initially be intermixed with a powder of matrix metal. Ball-milling of the two powders has been found to be a satisfactory mixing technique. The mixture is heated to a temperature at which the matrix material melts and mixing by mechanical means is used to disperse the powder. Cycling of temperature and pressure is sometimes useful to promote wetting where powder is somewhat resistant to wetting due to an adsorbed gas film on its surface. In some cases, the stabilizer powder is merely added to a bath of molten matrix metal and suitably mixed therein. Where a decomposable blowing agent is used, the stabilizer powder may first be mixed with the blowing agent and the composite thus formed mixed with solid or added to molten matrix metal. In the course of cellulating magnesium alloys, it has been discovered that substantially improved dispersion of stabilizer powder is obtained when the stabilizer powder is initially ball-milled, or otherwise intimately mixed with a portion of powdered metal that is miscible with the magnesium alloy. Most advantageously, this miscible metal is a finely ground portion of the base metal of the matrix (e.g., magnesium where the matrix is a magnesium alloy).

Cellation of the composition of this invention depends upon evolving gas in a molten metal and cooling the metal to freeze the cellular structure. As previously discussed, the source of the cellulating gas is not of importance in this invention. It is noteworthy, however, that this invention is amenable to a wide variety of cellulating techniques some of which have been heretofore unavailable to the art.

The following is a brief summary of cellulation techniques which are known, per se, in the art, and which may be improved by incorporating finely divided wettable powders within the metal. The list is not intended to be inclusive or exclusive, but merely to indicate the versatility of the present process. Foamed metals may be produced with discrete cells by: expanding molten metal amalgams (British Patent 206,797; U.S. 2,434,775; U.S. 2,553,016); by incorporating quartz microballoons in the molten metal and optionally heating to expand the gas (Chemical Engineering News, June 11, 1962, page 37); by the use of heavy metal hydride blowing agents, particularly the hydrides of titanium or zirconium (U.S. 2,393,906; U.S. 2,751,289; U.S. 2,895,819; U.S. 2,937,938; U.S. 2,974,034; U.S. 2,979,392; U.S. 2,983,597); by volatilizing organic materials during cooling of the melt (e.g., camphor, as in U.S. 2,155,651); by volatilizing inorganics other than metal hydrides (ammonium chloride, U.S. 1,642,348; magnesium carbonate, calcium hydroxide, copper nitrate, U.S. 1,642,349; calcium carbonate, U.S. 2,191,658; ammonium bicarbonate, U.S. 2,671,955; cadmium or magnesium carbonates, U.S. 2,935,396); and by pellet metallurgical techniques (magnesium carbonate blowing of magnesium metal, U.S. 2,935,396).

The references above may be relied upon for providing examples of suitable blowing agent-metal systems, as well as providing details for blowing conditions. In general, the conditions given in the references may be followed exactly, except that it is necessary to provide for an intimate admixture of the wettable powder of the present invention with the metal constituting the matrix. This usually requires that the metal and powder be admixed before adding the blowing agent, and where the blowing agent begins decomposing at the melting point of the metal, it may be necessary to cool the metal and wettable powder and grind the resulting solid before admixing the solid with blowing agent.

Although finely divided wettable powders improve cellulation where blowing agents are solids which either volatilize or which decompose under heat to form gases, it has been found that the use of the above powders is most advantageous in allowing the use of more economic and efficient cellulation techniques. These include cellulation where gases are either produced by chemical reaction in situ (for example, by reaction between magnesium metal and ammonia to produce solid magnesium nitride plus hydrogen gas) and evolved at reduced pressure or by dissolving a gas at a first pressure and then evolving the dissolved gas at a second, lower, pressure. In this method, cellularized metals may be formed by blowing with a gas such as hydrogen, or any other gas which has an appreciable solubility in the molten metal. In carrying out the method, the first pressure may be super atmospheric or atmospheric, while the second pressure may be atmospheric or less than atmospheric. The use of dissolved gases followed by reducing the pressure while cooling the stabilized metal below its solidification temperature is particularly advantageous. The merit of this technique as a means to provide small bubbles well dispersed throughout the melt has been recognized but has not been utilized successfully. Materials capable of evolving gas upon heating, such as zirconium hydride, have been recognized as having the inherent disadvantages of their instability at high temperatures and limit the degree of bubble dispersion to that which can be attained by mechanical agitation of the solid blowing agent. By contrast, when a dissolved gas is employed, only one parameter—pressure—provides full control over gas evolution rate, and a perfectly homogeneous solution of gas in molten metal may be attained. This procedure has not been commercially exploited prior to the present invention because foams were not stable enough to confine gas-filled cells produced by evolution of dissolved gases. The stabilizers of the invention render this method ideal for light metals such as magnesium and aluminum, as well as heavy metals such as cast iron or other ferrous metals.

In the aspect of the invention dealing with cellulation by evolution of dissolved gases, a gas typified by hydrogen (also nitrogen, helium, or other gas which is not irreversibly reactive with the metal constituents at the temperatures in question and has the required solubility) may be used to cellulate a magma composed of magnesium stabilized with a wettable powder such as finely divided iron; nonalloying powders are preferred as these provide nuclei for gas evolution. It is known that the solubility of hydrogen gas in liquid magnesium is given by the following formulae:

$$V_1 = 28 P^{0.5}$$

$V_1 =$ ml. $H_2$(STP) dissolved in 100 g. molten Mg $P =$ pressure in atmosphere Thus, for example, if molten magnesium is saturated with hydrogen at 9 atmospheres pressure and the pressure is then reduced to atmospheric while the melt is cooled, gas evolution will be:

$$V = V_1 - V_2 = 28(9^{0.5}) - 28(1^{0.5}) = 56 \text{ ml.}/100 \text{ g.}$$

If this gas is trapped within the metal at 1270° F., a product containing 210 ml. voids/100 g. or 80 percent of voids will result.

If high void fractions are desired, high initial pressure may be employed, or metals may be added to the magnesium that have a higher hydrogen absorptive capacity. Calcium, lithium and rare earths such as cerium and thorium may be used with magnesium. With aluminum, which has a low hydrogen solubility itself, calcium, lithium, titanium, zirconium, and rare earth metals such as cerium and thorium may be used.

The melt containing dissolved and evolving hydrogen may be converted into a cellular solid by depressuring and cooling, or by forcing the melt through a restricted passage to a low-pressure zone and cooling. In any event, this technique requires solution of gas in stabilized molten metal at a given pressure followed by reduction of pressure sufficient to evolve gas bubbles and then cooling to solidify the metal. The first pressure may be super atmospheric and the second atmospheric; the first may be atmospheric and the second subatmospheric, or the first super atmospheric and the second either lower super atmospheric or subatmospheric.

To illustrate an embodiment in which the composition of this invention is used in conjunction with the production of stable foams of structural capability by evolution of dissolved gas, consider production of foams from a commercially available magnesium base casting alloy AZ92 (9 percent aluminum, 2 percent zinc, 0.1 percent manganese, 1100° F. liquidus, 830° F. solids).

This alloy may be handled in steel vessels. By reason of its ability to dissolve hydrogen (28 ml. $H_2/100$ g. Mg.), hydrogen gas or other hydrogen-affording substances are effective blowing agents.

In testing a stabilizing powder, the powder is first ball-milled with commercially pure magnesium powder of about 150-mesh to improve ease of dispersing the stabilizing powder. Ball-milling done under conditions to promote mixing as opposed to grinding normally requires at least about 30 minutes. The mixture is then charged to a high-temperature high-pressure ball mill together with the AZ92 magnesium alloy.

A typical operating cycle in the high-temperature high-pressure ball mill is as follows. First, the system is stripped of air by repeatedly evacuating and pressuring with hydrogen. The ball mill is then heated to 1270° F. while rotating at 110 r.p.m. During this step, excess hydrogen is vented to maintain atmospheric pressure. Rotating and heating are continued for 2 hours, with periodic manual agitation in addition to ball milling. To absorb hydrogen gas, the mill is pressured with hydrogen to 100 p.s.i.g. and heating and rotating are continued for two additional hours. Finally, the uncellulated product is poured from the ball mill and permitted to cool.

Cellulation is effected by either of two procedures. In the first, and most generally used technique, a portion of the product above is placed in a container with an internal thermocouple in direct contact with the product. The container is evacuated, pressured with one atmosphere of hydrogen, and heated over a flame to 1270° F. When this temperature is reached, the flame is removed and the pressure quickly reduced to about one-third atmosphere absolute, which is maintained until the product cools and solidifies. Alternatively, the test tube containing the material to be cellulated is placed in a furnace, heated under about four atmospheres of hydrogen to 1270° F., and then depressured to one atmosphere and cooled. Cellulation is satisfactory under either procedure. When cellulation is done at a temperature substantially above the melting point of the base metal or alloy, it is sometimes advantageous to further reduce the pressure on cooling. This compensates for contraction of cellulating gas and avoids the resultant tendency for the cellular structure to contract and partially collapse.

A number of observations can be made on the anomalous effect of hydrogen pressure on the mixture of molten magnesium and dispersed stabilizer powder. Mixing under super-atmospheric hydrogen pressure gives dramatic and unusual changes in dispersibility of the stabilizer; in some cases hydrogen pressure improves the degree of stabilizer dispersion while in others it causes the stabilizer to separate from the mixture, thus necessitating a vacuum-type of cellulation for such mixtures. Hydrogen pressure also causes viscosity effects. A summary of these effects is given in the table below:

HYDROGEN PRESSURE EFFECTS

| Active Component in Wettable Powder | Characteristic Observed | | |
|---|---|---|---|
| | Atmos. Pressure | 50 p.s.i.g. | 100-150 p.s.i.g. |
| B | Readily dispersed | Readily dispersed | Dispersion stable, viscosity decreases |
| Be, Co, Cr, Fe, Ti | do | Dispersion stable | |
| Si | do | do | Powder separates. |
| N | do | do | |
| O | do | do | Powder separates. |
| Mo | do | Powder separates | |

From the foregoing discussion, it is clear that optimum control of product properties therefore involves (1) choice of a blowing agent and blowing conditions that will provide the desired void fraction, (2) provision of a nucleating agent to reach the required void size, and (3) selection of a wettable powder of suitable particle size and concentration that will stabilize the desired film thickness. If the film corresponding to the blowing agent and nucleating agent is too thick, stabilization will not occur (absence of a two-dimensional system); if too thin, dilatant stiffening will occur before cell formation is complete, with the result that inter-cellular films will rupture and weaken the structure.

Product control would also be affected by the rate of cellulation (inflation) and vibration. If gas evolution is slow, a higher stabilizer concentration is required than under conditions of rapid cellulation. Mechanical vibration increases the mobility of the mixture so that higher stabilizer concentrations can be tolerated.

This invention may be further understood by reference to the following examples illustrating specific systems in which the invention has been practiced.

*Example 1*

It was desired to evaluate the effectiveness of a wide variety of stabilizer powders and celluating agents in the production of a foam structure of an alloy of 95 percent of tin and 5 percent of zinc.

In a typical run, blowing agent (e.g., 0.08 gram of zirconium hydride) was ball milled with stabilizer powder (e.g., 3 grams of sub-325 mesh iron powder) to assure good mixing. The mixture was charged, together with tin-zinc alloy (e.g., 20 grams), to a test tube and heated in a hydrogen atmosphere to 400° F. to melt the alloy, and then cyclically between 600° and 800° F. while tapping the test tube to provide agitation to encourage wetting. Heating and tapping were continued so that the powder was thoroughly wetted and dispersed in the alloy. Vibration resulting from the tapping was found to be particularly effective for promoting wetting and dispersion.

Cellulation of the alloy-powder blend was conducted in the test tube at atmospheric pressure. A thermocouple was immersed in the charge and the tube inserted into a furnace held at 1140° F. Cellulation is assumed to be complete five minutes after a temperature of 900° F. is reached. At the end of five minutes, the test tube is removed from the furnace and allowed to cool; during cooling, a slight vacuum is applied to maintain constant volume of foam metal and to avoid contraction of the structure.

The cellular product was examined by cutting it in half and polishing to reveal structure and stabilizer conditions.

Cell structure can be recorded by making a contact print and the stabilizer condition determined by microscopic examination.

In several runs, different cellulating agents were employed; virtually any solid capable of evolving gas at a temperature above the melting point of the tin-zinc alloy is effective. The carbonates of calcium and magnesium, the hydrides of lithium, calcium, titanium, and zirconium, and phosphorus nitride were satisfactory. Zirconium hydride, by reason of its ease of wetting and temperature range of gas evolution, appears to be the most satisfactory of those tested for this particular alloy.

A large number of finely divided powders were evaluated for this system. All wettable powders are effective stabilizers; nonalloying molybdenum and alloying manganese, iron, cobalt, nickel, and zirconium gave satisfactory performance. Powdered chromium, zirconium, tungsten, ferrochrome, and ferromolybdenum were not wetted by the tin-zinc alloy and hence did not stabilize the foam.

Silicon carbide and quartz powders were, by themselves, not wetted by the system. However, the incorporation of wettable iron powders into the silicon carbide or quartz systems promotes wetting of the nonmetallic and produces a stabilized cellular metal structure. This latter effect is hereinafter disclosed in greater detail.

*Example 2*

The effect of particle size of a stabilizer powder that alloys with the matrix was studied for the alloy of 95 percent of tin and 5 percent of zinc using the procedure of Example 1 with 0.08 gm. of zirconium hydride as the blowing agent in 20 grams of tin-zinc alloy. Iron was selected as the alloying stabilizer powder.

The alloying ability of iron promotes excellent wetting by the tin-zinc base and thus assures maximizing stabilization efficiency. Conversely, it hinders iron from acting as a nucleating agent, and thus lowers nucleation effectiveness.

Fairly large particles, in the form of iron passing through an 80-mesh screen but stopped by a 150-mesh screen were too coarse to have any stabilizing effect on cellular metals in this system. However, a minus 325-mesh powder (prepared by reduction of iron oxide) gave good cellulation at a powder/alloy ("alloy" here refers to the tin-zinc alloy) weight ratio of 12.5/100. Substantially lower ratios exhibited poorer cell stability, while substantially higher ratios produced an inhomogeneous molten mixture which had a pasty consistency prior to cellulation resembling damp earth. Cellular metal prepared from this latter product had cells of irregular shape, with jagged imperfections at the cell surfaces.

With a slightly smaller particle size, estimated at about half the average particle size of the previously described material, a powder/alloy weight ratio of only 7.5/100 was needed to give an excellent stabilized foam.

Iron powder prepared by the thermal decomposition of iron carbonyl and having a 5-micron particle size yielded at a 10/100 weight ratio a product having large cells and with a bottom layer of solid metal. This is consistent with the use of very small, smooth, spherical particles of a powder having poor nucleating activity. With poor nucleation, only a small number of voids develop and hence a high void fraction is required before the intercellular films reach the thinness required for the small particle size stabilizer to be effective. As a result, rather large gas bubbles or cells form and rise through the melt until the resulting intercellular film is thinned to a dimension adequate for dilatancy to occur.

*Example 3*

It was desired to determine the stabilizing ability of a powder that does not alloy with molten alloy of 95 percent of tin and 5 percent of zinc but nevertheless is wetted by the molten alloy. The procedure of Example 2 was followed to produce a foam stabilized with molybdenum powder.

It was found that molybdenum wets with more difficulty than iron, and for this reason almost twice the quantity of molybdenum powder of a given particle size is necessary as compared with iron; stabilization with minus 325-mesh reduced molybdenum requires a ratio of powder to alloy of 26.5/100. Microscopic examination of a molybdenum-stabilized cellular product revealed a concentration of molybdenum particles around the voids or cells, suggesting that the particles act as nucleating agents.

Certain peculiarities were observed wth the molybdenum stabilized tin/zinc system. In viscosity/temperature studies with 20/100 and 30/100 ratio mixtures of molybdenum/tin alloy, viscosity increased gradually with temperature until the mixture reached 875° F. after which viscosity increased rapidly and a gel-like consistency developed. Also, it was observed that cellular product uniformity is improved by pretreating the molybdenum powder with hydrogen at 600° F. and atmospheric pressure.

*Example 4*

The effect of a mixture of alloying and nonalloying powders on the stability of a foam of 95 percent of tin and 5 percent of zinc was determined using the procedure of Example 3. A mixture of 20 parts of nonalloying molybdenum and 1 part alloying iron was mixed with 100 parts of the alloy of tin and zinc. The resultant foam was found to have an exceptionally outstanding structure.

*Example 5*

Stabilizer powders were studied in the production of foams of magnesium casting alloy AZ92. Typically, a stabilizing powder was first mixed with 15 grams of magnesium powder of about 150-mesh. The mixture was then charged to a high-temperature high-pressure ball mill with 35 grams of AZ92 alloy. Mixing was done under high-pressure hydrogen and material thus mixed was later cellulated in Pyrex test tubes. In some cases, cellulation was done by reduction of hydrogen pressure from 1.0 to 0.33 atm. followed by cooling, whereas in other cases heating was done under pressure of 4 atmospheres of hydrogen followed by depressuring to 1 atmosphere and cooling. Cellulated products were sectioned and the exposed surface examined visually and recorded by a contact print. Product density was determined on the basis of weight and linear dimensions. The results achieved with various stabilizers are shown in the tabulation below and contact prints corresponding to the products listed below are shown in FIG. 4.

| Run | Stabilizer | Weight Percent of Stabilizer | Void/Metal, Vol. Ratio | Structure |
|---|---|---|---|---|
| 1 | Silicon (Si) | 7 | 2.4 | Good. |
| 2 | Silicon | 7 | 2.5 | Do. |
| 3 | Boron (B) | 12 | 1.8 | Do. |
| 4 | Boron | 12 | 4.25 | Do. |
| 5 | Boron Nitride | 2.5 | 2.6 | Do. |
| 6 | Boric Anhydride ($B_2O_3$) | 3 | 2.4 | Do. |
| 7 | B+C+Si | 12/1/0.2 | 2.4 | Do. |
| 8 | B+$B_2O_3$ | 12/1 | 2.7 | Do. |
| 9 | B+$B_2O_3$ | 12/0.6 | 3.0 | Do. |
| 10 | B+Si | 6/3 | 2.2 | Do. |
| 11 | B+Fe | 11/2 | 2.0 | Do. |
| 12 | B+Co | 12/2 | 2.0 | Do. |
| 13 | B+Mo | 12/2 | 1.7 | Do. |
| 20 | Beryllium | 10 | 1.8 | Do. |
| 21 | Iron | 9 | 2.7 | Fair. |
| 22 | Cobalt | 17 | 2.5 | Do. |
| 23 | Molybdenum | 47 | 2.4 | Do. |
| 24 | Titania | 3 | 1.3 | Do. |
| 25 | Magnesium Oxide | 2 | 2.2 | Do. |
| 26 | Titanium | 30 | 0.8 | Poor. |
| 27 | Chromium | 37 | 0.8 | Do. |
| 28 | Silica | 2.5 | 1.1 | Do. |
| 29 | Silicon Carbide | 5 | 1.8 | Do. |
| 30 | Titanium Carbide | 14 | 3.2 | Do. |
| 31 | Boron Carbide | 12 | 2.5 | Do. |
| 33 | Boron+MgO | 8/2 | 1.2 | Do. |

Silicon gave exceptionally good results. Silicon is apparently present as magnesium silicide, $Mg_2Si$, which is formed or precipitated during mixing operations and appears as relatively large particles. With this system, cellulation was advantageously conducted at an initial hydrogen pressure slightly in excess of atmospheric; at hydrogen pressure of 100 p.s.i.g., the magnesium silicide separated as an unwettable bluish powder, which would redisperse upon lowering the pressure.

Amorphous boron gave a strong, satisfactory product. There was an unusual effect of hydrogen pressure; at atmospheric pressure, 12 percent amorphous boron causes magnesium to set to a solid while the application of 100 p.s.i.g. hydrogen to the same system forms a good fluid dispersion.

Boron nitride also gave a satisfactory product of somewhat improved corrosion resistance and with some economic advantages due to reduced stabilizer requirements. Boric anhydride, $B_2O_3$, likewise gave a strong economically attractive product, apparently via the reaction with magnesium to give magnesium oxide and boride. Boron was satisfactorily admixed with finely divided iron, cobalt, molybdenum, silicon, etc.

Magnesium oxide, either as such or formed by reaction with an added oxide, yielded poor results, except in the case of $B_2O_3$ noted above.

The high hydrogen capacity of titanium was evident in the tendency for premature cellulation and excessive gassing. Even when this is controlled, titanium and titanium carbide yielded product structures which are less satisfactory than others obtainable in the magnesium system.

Chromium gave a somewhat poorer product, presumably because coarser particle sizes of powder were used.

Silicon carbide did not yield a high quality structure. This may be improved by the use of very finely divided or amorphous silicon carbide.

Boron carbide, $B_4C$, yielded a very tough, abrasion resistant product, but with moderate structural and corrosion characteristics. The product from the mixture of boron and carbon did not have optimum structure.

Titania gave a good structure, but the product was brittle.

Iron, cobalt and molybdenum, while each wettable, have disadvantages because of the high density of the powder and the relatively high concentrations needed to obtain good stabilization.

Beryllium gave a product with excellent structural and corrosion resistance characteristics, but beryllium is presently too expensive for large scale use.

The rate of cellulation appears to be a more significant variable with magnesium than with the previously described alloy of tin of Examples 1 through 4. Rapid pressure reduction was necessary with most magnesium systems. This procedure promotes the formation of small bubbles in a sufficiently high concentration so that they expand to where two-dimension dilatancy occurs before the bubbles can rise any significant distance in the melt. In the tin system the nucleation action of a solid particle source of blowing gas and the lower surface tension of the alloy (520 dynes/cm. for tin as against 990 for magnesium) results in a large number of small bubbles even with slow gas evolution.

*Example 6*

Products were made of magnesium alloy using the in situ decomposition of ammonia as a source of cellulating gas and stabilizer. Magnesium reacts with ammonia to yield $Mg_3N_2$ plus three molecules of hydrogen gas. In a first operation, ammonia was added to the magnesium and the mixture was agitated while holding under pressure. Upon applying a vacuum and cooling, the resultant product showed a poor cellular structure traceable to a large particle size of $Mg_3N_2$ stabilizer. In a second operation, a portion of the stabilizer of $Mg_3N_2$ was provided as finely divided powder and tumbled with the alloy of magnesium prior to cellulation. The product obtained under these conditions contained 7 percent by weight of nitrogen and was cellulated to a void/metal volume ratio of 2.8. A contact print of the cellular structure is shown at 9 of FIG. 4. A marked improvement over the structure obtained with ammonia alone was observed.

*Example 7*

It was desired to produce foam structures from a base metal having a composition corresponding to that of a commercial cast iron. Foams were prepared by mixing the stabilizer (either alone or premixed with iron powder) with cast iron in a heated rotating Vycor test tube that had been flushed out with ammonia (hydrogen and helium are also usable) before use. While heating and rotation were maintained, the test tube was vibrated with an auxiliary vibrator motor. Cellulation was effected by terminating heating, rotation and vibration, and by applying a vacuum on the system. After cooling, the product was transferred to a furnace and at 950° F. overnight under a hydrogen atmosphere in order to decompose carbides and render the cast iron workable.

Optimum results were obtained with 11 percent of 5 micron titanium carbide stabilizer and nitrogen (from the ammonia) as the blowing agent.

Other stabilizing agents satisfactory for cast iron included graphite, beryllium carbide ($Be_2C$), titania, alumina and other oxides, and manganese sulfide (produced in situ).

Ferrous metals other than cast iron, such as the various steels, are similarly foamed by the technique of this example.

It has been further discovered that new and unique metal foams of magnesium alloy can be obtained with a composition that involves the addition of about an order of magnitude less of stabilizer powder than has been previously herein described. More specifically, it has been observed that when small amounts of carbon are included within the composition to be foamed, a cellular structure having excellent characteristics is obtained. These excellent characteristics have been maintained when carbon is added together with small amounts of powders such as boron or silicon which latter powders have been previously found to be effective stabilizers. While the exact nature of the stabilization effect operative when carbon is used is not definitely known, it is believed that carbon functions through a surface activity effect as opposed to the previously theorized dilatancy effect.

Carbon powder is effective whether added as graphite, furnace black, or acetylene, provided, in the case where a foam of magnesium is desired, the carbon and magnesium are first reacted at atmospheric pressure and 1270° F., and then pressured to 100 p.s.i.g. hydrogen with mixing until a substantial increase in viscosity is observed. A small amount of silicon greatly enhances the suitability of carbon, presumably this is due to a catalytic or nucleating effect, since microscopic examination of the celluated metal shows the absence of the characteristic $Mg_2Si$ particles in significant concentration. It is theorized that perhaps the increase in viscosity observed in the preparation step with hydrogen pressure is due to the conversion of magnesium carbide by partial hydrogenation to a magnesium methyl acetylide of surface active capability.

*Example 8*

Magnesium alloy mixed with carbon or combinations of carbon and other elements was mixed and heated to 1270° F. under pressure of 1 atmosphere of hydrogen for about 2 hours. Hydrogen pressure was increased to 100 p.s.i.g. and heating and mixing continued for 2 additional hours or until the viscosity of the charge no longer increased. The product was cellulated by the method of reduction of pressure to evolve dissolved hydrogen gas. The results of various operations are shown below and contact prints of certain of the materials described below are included in FIG. 4.

| Run | Stabilizer | Weight Percent of Stabilizer | Void/Metal Vol. Ratio | Structure |
|---|---|---|---|---|
| 14 | Carbon | Trace | 2.1 | Good. |
| 15 | ----do---- | Trace | 2.8 | Do. |
| 16 | C+Si | 0.5/0.7 | 3.8 | Do. |
| 17 | C+Si | 0.4/0.7 | 4.3 | Do. |
| 18 | B+C+Si | 6/0.7/0.7 | 2.9 | Do. |
| 32 | B+C | 2/1 | 3.5 | Fair. |

The products stabilized with trace amounts of carbon showed desirable characteristics but the performance of this system was not always reproducible. Satisfactory reproducibility was achieved when a small amount of silicon was used in combination with the carbon. Although the use of other stabilizers in substantial amounts with carbon may be beneficial in certain cases, it would not appear to be the case for boron under conditions of runs 18 and particularly 32.

Cellulated metals exemplified by magnesium are mechanically suitable as panels, but their utility for this purpose is somewhat limited by the tendency of the softened metal to dent, and the factors that there may be, with certain metal matrices, susceptibility to corrosion, some interconnecting porosity, and flammability. These possible shortcomings are eliminated, and the advantages of foamed or cellulated metals amplified, if the cellulated metal is faced with sheet metal. This sandwich-like structure is particularly convenient to manufacture when employing stabilized metals which are capable of cellulation by dissolved gas.

An example of a gas-cellulated metal is hydrogen cellulated magnesium, stabilized with a wettable powder such as iron or the like. Attention is invited to FIG. 5, schematically illustrating a flow sheet for the manufacture of cellular magnesium-filled "sandwich" panels.

A magma of stabilized molten magnesium is preformed and delivered to vessel 11 under about 4 atmospheres hydrogen pressure; vessel 11 is equipped with plug valve 12, which controls the rate at which molten magnesium, with hydrogen gas dissolved therein, is discharged from vessel 11.

Vessel 11 is located in furnace 13, in which hydrogen is maintained atmospheric pressure and approximately 1200° F. Also located in furnace 13 are two coils of sheet steel 14, which has been treated so that the magnesium foam will wet it easily. The required treatment will vary, depending on the stabilizer system and on the molten metal constituting the matrix, and may range from simple degreasing to preliminary plating, e.g., with magnesium. Sheet steel from the furnace is passed downward over gauge rolls 15, thence through cooling section 16, and finally out through a pair of drawing and sealing rolls 17.

Hydrogen or other nonoxidizing inert gas enters cooling section 16 via conduit 18 at the bottom thereof, and flows countercurrent to the flow of sheet steel and cellulated magnesium, finally discharging via conduit 19 near the top of cooling section 16.

In operation, steel sheets 14 move on parallel paths downward from furnace section 13 through cooling section 16, separated by a distance determined by the setting of gauge rolls 15 and at a rate controlled by drawing and sealing rolls 17. Optionally, auxiliary gauge rolls, not shown, may be disposed in cooling section 16.

Simultaneously with the movement of sheet steel 14, the hydrogen-containing (i.e., saturated) stabilized magnesium melt is released via flow control valve 12 from vessel 11 at a rate such that the space between the parallel steel sheets 14 is kept filled with magnesium foam. The magnesium solidifies as it passes through the cooling section, and discharges at exit port 20 at a temperature of about 200° F.

The panel so manufactured comprises a pair of parallel plates 21 and 22, which face and thereby protect the cellulated magnesium 23 from chemical and physical injury.

Totally aside from its utility in producing foamed or cellulated metals, the invention includes within its scope the discovery that the wetting of nonmetallic surfaces by molten metals is promoted by the addition of finely divided powders that are themselves readily wetted by the molten metal.

The wetting of metallic and nonmetallic surfaces with molten metals is required in many applications. In particular, where bonding is sought between a metal and at least one nonmetallic body, the metal body is usually melted to thus adhere to the nonmetallic body and is subsequently cooled to form an adherent bond therewith. This is the case in such diverse fields as in the manufacture of electric light bulbs and vacuum tubes (to produce the metal-glass seals) and in making mosaics of transparent bits of colored glass for church windows. In the fabrication of electronic equipment from solid state components, e.g., silicon diodes, transistors, tunnel diodes, and the like, metal terminals may be attached to the solid state device by employing electrically conductive low-melting metals. "Cermets" are completely bonded nonporous metal matrices surrounding various ceramic constituents. Wetting is necessary to accomplish this objective. Corrosion-resistant metals as titanium, zirconium, and tantalum are highly desirable as internal surfaces for chemical reaction vessels and the like. In general, these metals are excessively expensive or brittle, so that the complete vessel is usually not fabricated of the metal. Instead, liners of titanium, zirconium, tantalum, or the like are applied to carbon steel vessels by welding, cladding, or similar techniques. Nonskid surfaces of abrasives embedded in a matrix or abrasive articles of similar construction are also useful. The matrix imparts the ability to withstand sudden shock or impact upon the composite structure having abrasive properties.

Problems arise in the manufacture of articles of the above-described type when molten metals do not wet the nonmetallic bodies. This means that, upon cooling, two distinct members remain which do not function as a composite structure. Thus, where a combination of metallic and nonmetallic bodies is used, the most desirable combination of bodies from the standpoint of properties may not be compatible. That is to say the metallic body in molten condition does not wet the nonmetallic body. Similarly, where two different nonmetallic bodies are to be joined by means of a metallic layer interposed therebetween the most desirable combinations are not always a realistic possibility.

By the addition of wettable powders to bonding metals as will be further described herein, a bond and method of bonding dissimilar materials are provided wherein most favorable combinations of metals and nonmetals can be utilized.

In the discussion of the invention herein described, wetting powder refers to the intimately dispersed finely divided powder contained in a second metal thereby rendering the latter of improved wetting ability when in molten condition. Bonding metal refers to a metal rendered capable of wetting the surfaces to be bonded by the addition of wetting powder thereto.

In practicing the method of this invention, a wettable wetting powder is mixed with the metal whose wetting ability is to be improved. In the case of bonding, the wetting powder is mixed with bonding metal acting to serve as: (1) the bonding means between two different nonmetallic or metallic bodies, or (2) as one of the major metallic components of a multicomponent structure. The mixture of wetting powder and bonding metal is placed in superimposed relation with the surface to be wetted. The materials thus disposed are heated, usually in a nonreactive atmosphere, to a temperature at least equal to the melting point of the bonding metal member but less than the melting point of the material to be wetted. Moderate agitation is desirable to insure adequate dispersion of wetting powder in the bonding metal and to promote intimate contact between the bonding metal and the surfaces to be bonded. The materials are then cooled to room temperature and excellent adherence of bonding metal is obtained.

Generally, the wetting powder must be: (1) wetted by the bonding metal when the latter is in molten conditions, (2) of proper size, preferably less than about 50 microns, (3) of adequate concentration, and (4) substantially non-decomposable and nonmelting at the operating temperatures. The powder used, its concentration, and particle size are selected on the basis of the system that is to be bonded. Generally where the powder used can form a solid surface alloy with the molten metal, about 10 percent by weight of −325 mesh powder has been found to be a satisfactory addition to render a normally nonwetting metal capable of wetting a second material (usually nonmetal). Where the powder is nonalloying, slightly greater amounts of powder having about the same particle size as that described for alloying powder are required. Although, alloying or nonalloying powders may be used alone, it has been found that the use of combinations of alloying and nonalloying powders has merit in some applications.

Other than the requirements that wetting powders be of proper size, wetted by the molten bonding metal, in adequate concentration to achieve the desired result, and stable at operating temperatures, the specific nature of the powder is not critical. Powders may be metals or nonmetals, elements or compounds, and either added in the form of a powder or formed in situ by alloying of the added powder with the base metal or by decomposition of a powder precursor.

Powders may be added intermixed with a second powder which is miscible with, and may be the same as, the molten metal or a component thereof. Wettability of the powder by the metal may be determined experimentally by observing whether the powder may be dispersed in the molten metal at the temperature for bonding, or may be ascertained by measuring the surface tension of the powder and comparing it with the interfacial tension between the metal and the powder, if interfacial tension is the lesser, then wettability is obtained.

The exact quantity of wetting powder needed to cause the bonding metal to wet a surface that is not normally wetted by the bonding metal is determined easily by routine experimentation. This will become more apparent from the specification and the examples disclosed herein.

A wide variety of techniques are available for adding the wetting powders to the bonding metals. The powder may be thoroughly intermixed with molten bonding metal to be rendered wetting. Where required, mixing may be facilitated by a variety of techniques including cyclical heating of the mixture of molten metal and powder or by applying vibration or moderate mechanical agitation. The wetting powder may also be intermixed with a powder of bonding metal and the combination heated above the melting point of the latter. Ball-milling of the two powders has been found to be a satisfactory mixing technique. Other mixing techniques previously described for metal foam applications may be found suitable for various metal systems. This includes initially ball-milling the wetting powder, or otherwise intimately mixing the wetting powder with a portion of powdered metal that is miscible with the bonding metal. Most advantageously, the miscible metal is a finely ground portion of the bonding metal or alloy. Mixing of wetting powder and bonding metal may also be done under super or subatmospheric pressure.

The invention may be further understood by reference to the following examples illustrating the practice of this invention.

*Example 9*

It was desired to determine the effectiveness of wetting powders on the ability of Pyrex glass to be wet by an alloy of 95 percent of tin and 5 percent of zinc. The wetting powder, its quantity and particle size, and the manner of mixing during processing with the bonding metal were studied.

In a typical operation, wetting powder was mixed with 3 ml. of −30+60 mesh ground Pyrex glass. The above mixture was then placed in a container with 20 grams of an alloy of 95 percent of tin and 5 percent of zinc (melting point, 400° F.). The atmosphere of the container was then alternately evacuated and pressured with hydrogen. Heating was done under hydrogen atmosphere to 900° F. and cyclical heating between 500° F. and 900° F. followed. To promote wetting, the container was tapped at frequent intervals during cyclical heating. Product thus formed was cooled and the degree of wetting of glass by the metal alloy studied by sectioning the product and examining visually. In some operations, wetting powder and molten alloy were mixed prior to the addition of the glass. The tabulation below summarizes the degree of wetting obtained as a result of various procedures.

| Sample | Wetting Powder | | | Heating Cycles Between 500° F. and 900° F., No. | Results, Degree of Wetting of Pyrex |
|---|---|---|---|---|---|
| | Nature | Quantity, g. | Mesh Size | | |
| 1 | None | | | 5 | None. |
| 2 | Baker Fe [1] | 1.0 | −325 | 5 | Fair. |
| 3 | Baker Fe | 2.0 | −325 | 5 | Excellent. |
| 4 | Electrolytic Fe | 3.0 | +325 | 8 | None. |
| 5 | Mo | 3.0 | −325 | 5 | Good. |
| 6 [2] | Baker Fe | 2.0 | −325 | 5 | Fair. |
| 7 [2] | Mo | 3.0 | −325 | 5 | Good. |
| 8 | Baker Fe | 1.0 | −325 | 5 | Fair.[3] |

[1] J. T. Baker Chemical Company.
[2] Pyrex glass added to molten mixture of wetting powder and metal alloy.
[3] Pyrex glass replaced by 4 ml. of 100 grit silicon carbide.

It can be observed that wetting powders of iron and molybdenum both promote wetting of the Pyrex. The particle size of iron powder used is shown by sample 4 to exert an influence on the ability of the alloy of tin and zinc to wet Pyrex. In addition, it is shown by samples 6 and 7 that it is not necessary to first intimately mix the Pyrex with the wetting powder.

*Example 10*

It has been observed that a powder of zirconium hydride is not readily wetted by a molten alloy of 95 percent of tin and 5 percent of zinc. The method of Example 2 was followed to determine whether the wettability of zirconium hydride could be improved by the practice of this invention. It was found that the addition of a small amount of −325 mesh iron powder to a system comprising a molten alloy of tin and zinc and zirconium hydride powder caused the hydride to be thoroughly dispersed throughout the molten mixture when the latter was subjected to mild agitation. In the absence of the above-described iron powder, dispersion of the zirconium hydride did not occur.

*Example 11*

A volume of 5 ml. of Kanamite slag microballoons having a diameter of about 750 microns were mixed with 20 grams (2.75 ml.) of an alloy of 95 percent of tin and 5 percent of zinc. To encourage wetting, the mixture was severely agitated, pressure was raised from near vacuum to atmospheric, and temperature was cycled between 400° F. and 900° F. No wetting of the Kanamite could be achieved. The addition of 2.5 grams of −325 mesh iron powder followed by heating to 800° F. and cooling to 500° F. while applying mild agitation resulted in complete wetting of the Kanamite material. A smaller amount of iron powder, 1.25 grams, was almost equally beneficial in a second case.

The novel features of this invention as disclosed by the examples and disclosures hereinabove set forth have been generally illustrated by a composition suitable for the production of cellular metal or metal foams comprising a major proportion by weight of metal that is to be foamed and a minor proportion by weight of an intimately dispersed finely divided, inert powder or powders possessed by the property of being wetted by the metal which comprises a major proportion of the composition when the latter is in molten state. The composition is characterized by the ability to provide a foam metal structure having a heretofore unobtainable uniform dispersion of gas-filled cells. The novel features of this invention have been further characterized by the discovery that the wetting of nonmetallic surfaces by molten metals is promoted by the addition of finely divided powders to the latter that are themselves readily wetted by the metal.

One advantage of this invention is that a composition is provided for production of cellular metals resulting in a low-cost product having desirable and reproducible properties.

Another advantage of this invention is that a composition is provided for production of metal foams allowing greater flexibility in the control of cell structure.

Still another advantage of this invention is that a composition is provided which produces a cellular metal that is stable at high temperatures thus avoiding the necessity of timed freezing of a transient structure.

Yet another advantage of this invention is that a composition is provided for the production of cellular metal foams which is amenable to a wide variety of novel cellulating techniques.

Another advantage of this invention is that a method is provided for improving the wetting of metallic and nonmetallic bodies not normally readily wet by molten metals.

Still another advantage of this invention is that a bond and method of bonding nonmetallic materials to metallic materials is provided.

Yet another advantage of this invention is that a bond and method of bonding is provided for dissimilar materials having utility when acting in combination, said utility having been heretofore unobtainable for lack of convenient means of bonding together such dissimilar materials.

Many other uses and advantages for the composition of this invention will be apparent to those having a need for cellular metal structures.

It will be apparent that new and useful compositions for the production of cellular metal foams have been described. It will be further apparent that new and useful methods of wetting metallic and nonmetallic surfaces with molten metals have been described. Although several preferred embodiments of the invention have been described, it is apparent that modifications may be made therein by those skilled in the art. Such modifications may be made without departing from the spirit or scope of the invention, as is set forth in the appended claims.

What is claimed is:

1. In the method of producing cellularized metal by decomposition of a heat-decomposable gas evolving compound in molten metal followed by rapid cooling of said metal, the improvement which comprises adding to said metal prior to decomposition of said heat-decomposable gas evolving compound an intimately dispersed finely divided powder,
   said powder present in an amount not exceeding 50 percent by weight but in an amount sufficient to render a matrix of the metal stable when said metal is in molten condition to confine predominantly contiguous and compact gas-filled cells,
   said powder possessed of the properties of:
      (1) being wetted by the metal when the latter is in molten condition, and
      (2) being substantially stable in the presence of the metal when said metal is in molten condition.

2. The method of producing cellularized metal comprising the steps of:
   (a) preparing a composition of molten metal and an intimately dispersed finely divided powder,
      said powder being present in an amount not exceeding 50 percent by weight but sufficient to render a matrix of said molten metal stable to confine predominantly contiguous and compact gas-filled cells,
      said powder having the properties of:
         (1) being wetted by said molten metal; and
         (2) being substantially stable in the presence of said molten metal;
   (b) dissolving a gas in said composition of molten metal and an intimately dispersed finely divided powder from the gas atmosphere surrounding said composition;
   (c) reducing the pressure of the gas atmosphere surrounding said composition of molten metal and an intimately dispersed finely divided powder to evolve gas from said composition and thereby form a stabilized foam of said composition; and
   (d) cooling said stabilized foam of said composition to below the solidification temperature of said molten metal.

3. The method of producing cellularized metal comprising the steps of:
   (a) intimately mixing a composition of a metal and a finely divided powder in a container,
      said powder being present in an amount not exceeding 50 percent by weight but sufficient to render a matrix of said molten metal stable to confine predominantly contiguous and compact gas-filled cells,
      said powder having the properties of:
         (1) being wetted by said molten metal; and
         (2) being substantially stable in the presence of said molten metal;
      said mixing step carried out continuously while:
         (1) heating said composition of a metal and a finely divided powder to elevated temperature under a gaseous atmosphere to melt said metal; and
         (2) increasing the pressure of said gaseous atmosphere;
   (b) maintaining said mixing for a period of time sufficient to allow the viscosity of the composition of molten metal and a finely divided powder to increase;
   (c) removing said composition of molten metal and a finely divided powder from said container;

(d) dissolving a gas in said composition of molten metal and an intimately dispersed finely divided powder from the gas atmosphere surrounding said composition;

(e) reducing the pressure of the gas atmosphere surrounding said composition of molten metal and an intimately dispersed finely divided powder to evolve gas from said composition and thereby form a stabilized foam of said composition; and (f) cooling said stabilized foam of said composition to below the solidification temperature of said molten metal.

4. The method of claim 3 wherein the said finely divided powder is mixed in the form of an intimate mixture of finely divided powder and a second powder, said second powder possessed of the property of being miscible with said molten metal.

5. An article of cellularized metal comprising:
(a) a metal matrix confining predominantly contiguous and compact gas-filled cells of the group consisting of magnesium and alloys thereof; and
(b) less than about 10 percent by weight of a finely divided powder of the group consisting of carbon, carbon plus silicon, and carbon plus boron intimately dispersed in said matrix.

6. The method of claim 3 wherein said metal is from the group consisting of magnesium and alloys thereof, said powder is a mixture of carbon and silicon, and said gaseous atmosphere is hydrogen.

7. The method of producing cellularized metal comprising the steps of:
(a) preparing a composition of molten metal, a source of cellulating gas, and an intimately dispersed finely divided powder, said powder being present in an amount not exceeding 50 percent by weight but sufficient to render a matrix of said molten metal stable to confine predominantly contiguous and compact gas-filled cells,
said powder having the properties of:
(1) being wetted by said molten metal; and
(2) being substantially stable in the presence of said molten metal;
(b) evolving gas from said composition to thereby form a stabilized foam of said composition; and
(c) cooling said stabilized foam of said composition to below the solidification temperature of said molten metal.

References Cited by the Examiner
UNITED STATES PATENTS

| | | |
|---|---|---|
| 2,118,707 | 5/1938 | Ingouf. |
| 2,215,223 | 9/1940 | Lytle. |
| 2,570,248 | 10/1951 | Kelley. |
| 2,652,624 | 9/1953 | Guinee _____ 29—191.2 X |
| 2,775,531 | 12/1956 | Montgomery et al. |
| 2,974,034 | 3/1961 | Fiedler et al. _____ 75—20 |
| 2,983,597 | 5/1961 | Elliott _____ 75—20 |
| 3,006,044 | 10/1961 | Mayer. |
| 3,055,763 | 9/1962 | Kreigh et al. _____ 75—20 X |
| 3,087,807 | 4/1963 | Allen et al. _____ 75—20 |
| 3,109,716 | 11/1963 | Slayter _____ 29—191.2 |

FOREIGN PATENTS 615,147   10/1926   France.

BENJAMIN HENKIN, *Primary Examiner.*